(12) United States Patent
Carr (10) Patent No.: US 8,271,800 B2
(45) Date of Patent: *Sep. 18, 2012

(54) SYSTEM AND METHOD FOR PROCESSING AND PROTECTING CONTENT

(75) Inventor: Jeffrey Douglas Carr, Poway, CA (US)

(73) Assignee: Broadcom Corporation, Irvine, CA (US)

(*) Notice: Subject to any disclaimer, the term of this patent is extended or adjusted under 35 U.S.C. 154(b) by 118 days.

This patent is subject to a terminal disclaimer.

(21) Appl. No.: 12/485,694

(22) Filed: Jun. 16, 2009

(65) Prior Publication Data

US 2009/0287940 A1 Nov. 19, 2009

Related U.S. Application Data

(63) Continuation of application No. 10/326,944, filed on Dec. 20, 2002, now Pat. No. 7,549,056, and a continuation-in-part of application No. 10/310,083, filed on Dec. 4, 2002, and a continuation-in-part of application No. 10/310,075, filed on Dec. 4, 2002, now Pat. No. 7,797,550, and a continuation-in-part of application No. 10/153,338, filed on May 22, 2002, now Pat. No. 7,058,803, and a continuation-in-part of application No. 10/141,549, filed on May 8, 2002, now Pat. No. 7,810,152, and a continuation-in-part of application No. 10/141,599, filed on May 8, 2002, now Pat. No. 6,789,159, and a continuation-in-part of application No. 10/141,197, filed on May 8, 2002, now Pat. No. 7,681,043, and a continuation-in-part of application No. 09/900,224, filed on Jul. 6, 2001, now Pat. No. 7,548,622, and a continuation-in-part of application No. 10/053,904, filed on Jan. 24, 2002, now Pat. No. 7,174,452, and a continuation-in-part of application No. 09/525,872, filed on Mar. 15, 2000, now Pat. No. 6,868,072.

(60) Provisional application No. 60/410,771, filed on Sep. 13, 2002, provisional application No. 60/413,871, filed on Sep. 25, 2002, provisional application No. 60/414,080, filed on Sep. 27, 2002, provisional application No. 60/419,711, filed on Oct. 17, 2002, provisional application No. 60/419,353, filed on Oct. 18, 2002, provisional application No. 60/419,474, filed on Oct. 18, 2002, provisional application No. 60/216,588, filed on Jul. 7, 2000, provisional application No. 60/263,793, filed on Jan. 24, 2001, provisional application No. 60/272,965, filed on Mar. 2, 2001, provisional application No. 60/125,174, filed on Mar. 19, 1999, provisional application No. 60/125,292, filed on Mar. 19, 1999.

(51) Int. Cl.
*G06F 21/24* (2006.01)

(52) U.S. Cl. .............................. 713/189; 726/26; 726/27

(58) Field of Classification Search .................. None
See application file for complete search history.

(56) References Cited

U.S. PATENT DOCUMENTS 6,064,739 A  5/2000 Davis
(Continued)

FOREIGN PATENT DOCUMENTS

WO  WO 00/56068  9/2000

OTHER PUBLICATIONS

Universal Broadband Network Access Device. Bonney et al. IEEE(1996).*

(Continued)

*Primary Examiner* — Venkat Perungavoor (74) *Attorney, Agent, or Firm* — Sterne, Kessler, Goldstein & Fox P.L.L.C.

(57) ABSTRACT

Systems and methods that process and protect content are provided. In one example, a system may include, for example, a first device coupled to a second device. The first device may include, for example, an integrated circuit that may include a content processing system and a security system. The security system may include, for example, a digital rights manager. The first device and the second device may be part of a network. The network receives content and control information via the first device. The content processing system processes incoming content based upon at least the control information. The integrated circuit protects the content before placing the content on the network.

22 Claims, 6 Drawing Sheets

U.S. PATENT DOCUMENTS

| | | | |
|---|---|---|---|
| 7,213,157 | B2 | 5/2007 | Dariel |
| 7,224,805 | B2 | 5/2007 | Hurst et al. |
| 7,421,411 | B2 * | 9/2008 | Kontio et al. ............... 705/52 |
| 2002/0006204 | A1 | 1/2002 | England et al. |
| 2002/0065730 | A1 | 5/2002 | Nii |
| 2003/0131353 | A1 | 7/2003 | Blom et al. |
| 2004/0039932 | A1 | 2/2004 | Elazar et al. |
| 2004/0044774 | A1 | 3/2004 | Mangalik et al. |
| 2004/0117500 | A1 | 6/2004 | Lindholm et al. |

OTHER PUBLICATIONS

Cryptographic Samrt Cards.Naccache et al.IEEE(1996).*
"Digital Video Broadcasting (DVB); Framing Structure, channel coding and modulation for digital terrestrial television", European Telecommunications Standards Institute; ETSI TS 101 197 V1.2.1; Technical Specification; 40 pages; Feb. 2002.
"Digital Video Broadcasting (DVB); DVB SimulCrypt; Head-end architecture and synchronization", European Telecommunications Standards Institute, ETSI EN 300 744 V1.4.1, European Standard (Telecommunications series), 49 pages, Jan. 2001.
"Creating a Subscription Service with Windows Media Rights Manager 7", Windows Media DRM 7, Microsoft Corp., 7 pages, Nov. 2000.
"Getting Started with Windows Media Rights Manager SDK", Windows Media DRM 7, Microsoft Corp., 6 pages, Jun. 2002.
"Macintosh Client Support for the Windows Media License Service", Windows Media DRM 7, Microsoft Corp., 2 pages, 2008.
"Macintosh Update for Windows Media License Service", Windows Media DRM 7, Microsoft Corp., 3 pages, Aug. 2001.
"New Features for Microsoft Windows Media Rights manager SDK 7.1", Windows Media DRM 7, Microsoft Corp., 3 pages, Oct. 2001.
"Protecting Audio and Video Content with Digital Rights Management", Windows Media DRM 7, Microsoft Corp., 15 pages, Apr. 2004.
"Security Overview of Microsoft Windows Media Rights Manager", Windows Media DRM 7, Microsoft Corp., 9 pages, Oct. 2001.
"Streaming Secure Files with Windows Media Rights Manager 7", Windows Media DRM 7, Microsoft Corp., 4 pages, Oct. 2000.
"Supporting Both Version 1 and Version 7 of Windows Media Rights Manager", Windows Media DRM 7, Microsoft Corp., 5 pages, Jan. 2001.
"Taking Advantage of Super Distribution with Windows Media Rights Manager 7", Windows Media DRM 7, Microsoft Corp., 5 pages, Nov. 2000.
"Digital Rights Management for Microsoft Windows Media™ Technologies, The proven DRM platform for secure digital media e-commerce", Microsoft Corp., 4 pages, 2001.
Jeff Carr; Copy Protection and Digital Rights Management Technologies; Oct. 18, 2001; pp. 1-13.
International Organization for Standardization=Organisation Internationale De Normalisation: "Draft International Standard Dis 13818-1(MPEG-2 Part 1): Generic Coding of Moving Pictures and Associated Audio Information" Information Technology—Generic Coding of Moving Pictures and Associated Audio Information. Part 1: Systems. Draft International Standard ISO/IEC Dis 13818-1, Geneva, ISO, CH, 1994, pp. 21-27, 36-45, XP002040638, paragraph 2.4.4.
"High-Bandwidth Digital Content Protection" Paper Silicon Image, Feb. 2000, pp. 1-11, XP002907864.
P.J. Lenior, "Functional Model for the DVB CPCM Framework," Royal Philips Electronics Presentation, Feb. 2002.
Rowan Vevers, "DVB Sub-Group on Commercial Requirements for Copy Protection Systems Report to the Eighteenth Meeting of the DVB Commercial Module (DVB-CM)," DVB Report, DVB-CP8(00)7, Oct. 2000.
Jeff Carr, "Response to DVB Call for Information Copy Protection and Digital Rights Management Technologies," Broadcom Corp., Oct. 2001.
"Call for Proposals for Content Protection & Copy Management Technologies," DVB, DVB Technical Module Sub-Group on Copy Protection Technologies, DVB CPT rev 1.2, Jul. 2001.

Ji et al., "Open Letter following Proposal DVB-CPY-719," Feb. 2002.
"SCTE Proposed Standard Head-end Implementation of OpenCAS™," Society of Cable Telecommunications Engineers, Inc., Engineering Committee, Digital Video Subcommittee, SCTE DVS 278r1, Jul. 2000.
"Data-Over-Cable Interface Specification," MCNS Holdings, L.P., Security Systems Specification, SP-SSI-I01-970506, 1997.
"DES CBC Packet Encryption," General Instrument Corp., SCTE DVS/042, Nov. 1996.
"CD-Rom Based Application Software Consumer and SOHO Copying Trends," Merrill Research Associates, Apr. 2000.
"White Paper—The Ins and Outs of Content Delivery Networks," Stardust.com inc., Dec. 2000.
"CD-Rom Unauthorized Copying Study Executive Summary," Merrill Research Associates, Apr. 1999.
"UDAC-M Host Link Specification, Part 1: Overview," Keitaide-Music Consortium, Ver. 0.9, Dec. 2000.
"Keitaide-Music Technical Specification Part I Overview," Keitaide-Music Consortium, Ver. 1.0, Dec. 2000.
"EPRS8 White Paper," SecureMedia, Inc., 2000.
William Raike "Detailed Supplemental Technical Description of the RPK Public-Key Cryptographic System," 1996.
Joseph M. Winograd, "Audio Watermarking Technologies for Protection of Digital Audio and Video—Presentation to DVD CPTWG," Verance Corporation, Sep. 2000.
John Paddleford, "Digital Rights Management—Protecting Your Content," Microsoft Corporation, undated.
"Common Interface Specification for Conditional Access and Other Digital Video Broadcasting Decoder Applications," DVB, DVB Document A017, May 1996.
"Call for Proposals for Content Protection & Copy Management Technologies," DVD, DVB Technical Module Sub-Group on Copy Protection Technologies, Rev. 1.2, Jul. 2001.
Bechtolsheim et al., "Responses to DVB-CP Requirements (DVB-CM283) for the OCCAM Open Conditional Content Access Management System," Cisco Systems, Inc. Oct. 2001.
"NetDRM Technology Response to DVD Call for Proposals for Content Protection & Copy Management Technologies," DVD, Matsushita Electric Industrial Co., Ltd., Oct. 2001.
"Proposal for Content Protection & Copy Management Technologies submitted to DVB (Digital Video Broadcasting," Veridian, Oct. 2001.
"Response to the DVB-CPT Call for Proposals for Content Protection & Copy Management Technologies," Royal Phillips Electronics N.V., Oct. 2001.
Kish et al., "An Information Paper in Response to the Call for Proposals Issued by the DVB Copy Protection Technologies Sub-Group of the DVB Technical Module," VWM Companies, Oct. 2001.
"Proposals for Content Protection and Copy Management Technologies," Sony International (Europe), Oct. 2001.
Olsthoorn et al., "Flexcop—A Flexible Copy Protection Framework," Irdeto Access BV, DVB-CPT-709, Nov. 2001.
"Proposals for DVB Content Protection & Copy Management Technologies," Nokia, Version 1.0, Oct. 2001.
"4C Entity Response to DVB CPT Call for Proposals Regarding Content Protection & Copy Management Technologies—Content Protection System Architecture—A Comprehensive Framework for Content Protection, with CPPM and CPRM Technologies," 4C Entity, LLC, Oct. 2001.
"SmartRight Answer to the Call for Proposals for Content Protection & Copy Management Technologies," Thomson Multimedia et al., Oct. 2001.
"Answer to Call for Proposals for Content Protection & Copy Management Technologies," Thales Communication, Oct. 2001.
"IBM Response to DVB CPT Call for Proposals Regarding Content Protection & Copy Management: xCP Cluster Protocol," IBM, Oct. 2001.
"Digital Transmission Licensing Administrator's (DTLA) Response to DVB-CPT Call for Proposals Concerning Content Protection & Copy Management Technologies Protected Transport of Commercial Entertainment Content Using DTCP Technology," DTLA, 2001.
Winograd et al., "Audio Watermarking System for Content Protection within a DVB CPCM Environment," Verance Corporation, Oct. 2001.

"Proposed Baseline DVB-CPCM Response to DVB-CPT Call for Proposal Concerning Content Protection & Copy Technologies," Matsushita Electric Industrial Co., Ltd., Oct. 2001.

"Response to the Call for Proposals Content Protection and Copy Management Technologies by DVB Copy Protection Technologies Sub-Group of DVB Technical Module," Pioneer Corporation, Oct. 2001.

Kudumais, et al., "OPIMA/OCCAMM: A Solution to DVB Call for Proposals for Content Protection & Copy Management Technologies," OCCAMM, Nov. 2001.

Capitant et al., "Digital Rights Management & Copy Protection an Information Paper in Response to the Call for Proposals Issued by the DVB Copy Technologies Sub-Group of the DVB Technical Module," Macrovision Corporation and Widevine Technologies Oct. 2001.

"Content Protection System Architecture a Comprehensive Framework for Content Protection, with High-Bandwidth Digital Content Protection (HDCP) Technology," Digital Content Protection, LLC, Oct. 2001.

"Digimarc Response to DVB_CPCM CFP: Watermarking Applications Information Paper," Digimarc Corporation, Oct. 2001.

Agnelli et al., "LAN Interconnection Via ATM Satellite Links for CAD Applications: The UNOM Experiment," Jun. 1996.

Löytänä et al., "Session Management Problems in Narrowband Interactive Services," Ad Hoc Group on Systems for Interactive Services, Apr. 1996.

"Presentation to the TM," Simulcrypt Technical Group, undated.

"The DVB Project Promotion and Communication Module," DVB Project Office, Digital Video Broadcasting Presentation, undated.

"Digital Video Broadcasting (DVB); Support for Use of Scrambling and Digital Broadcasting Systems," European Telecommunications Standards Institute, ETSI Technical Report ETR 289, Oct. 1996.

"Digital Video Broadcasting (DVB); DVB SimulCrypt; Part 1: Headend architecture and synchronization," European Telecommunications Standards Institute, ETSI Technical Report TS 101 197-1 v1.1.1 1997-06.

"IPsec Processing," Microsoft Corporation et al, 1998.

"IPsec Databases," MSRIPv6, Microsoft Corp., Oct. 1998.

* cited by examiner

SYSTEM AND METHOD FOR PROCESSING AND PROTECTING CONTENT

CROSS-REFERENCE TO RELATED APPLICATIONS/INCORPORATION BY REFERENCE

The present application is a CONTINUATION of U.S. application Ser. No. 10/326,944, filed Dec. 20, 2002, now issued U.S. Pat. No. 7,549,056. Said U.S. application Ser. No. 10/326,944 makes reference to, claims priority to and claims benefit from U.S. Application No. 60/410,771, filed Sep. 13, 2002; U.S. Application No. 60/413,871, filed Sep. 25, 2002; U.S. Application No. 60/414,080, filed Sep. 27, 2002; and U.S. Application No. 60/419,711, filed Oct. 17, 2002.

Said U.S. application Ser. No. 10/326,944 is a CONTINUATION-IN-PART of U.S. application Ser. No. 10/310,083, filed Dec. 4, 2002. Said U.S. application Ser. No. 10/310,083 claims priority to and claims benefit from U.S. Application No. 60/414,080, filed Sep. 27, 2002, and U.S. Application No. 60/419,353, filed Oct. 18, 2002.

Said U.S. application Ser. No. 10/326,944 is also a CONTINUATION-IN-PART of U.S. application Ser. No. 10/310,075, filed Dec. 4, 2002, now issued U.S. Pat. No. 7,797,550. Said U.S. application Ser. No. 10/310,075 claims priority to and claims benefit from U.S. Application No. 60/413,871, filed Sep. 25, 2002, and U.S. Application No. 60/419,474, filed Oct. 18, 2002.

Said U.S. application Ser. No. 10/326,944 is also a CONTINUATION-IN-PART of U.S. application Ser. No. 10/153,338, filed May 22, 2002, now issued U.S. Pat. No. 7,058,803.

Said U.S. application Ser. No. 10/326,944 is also a CONTINUATION-IN-PART of U.S. application Ser. No. 10/141,549, filed May 8, 2002, now issued U.S. Pat. No. 7,810,152.

Said U.S. application Ser. No. 10/326,944 is also a CONTINUATION-IN-PART of U.S. application Ser. No. 10/141,599, filed May 8, 2002, now issued U.S. Pat. No. 6,789,159.

Said U.S. application Ser. No. 10/326,944 is also a CONTINUATION-IN-PART of U.S. application Ser. No. 10/141,197, filed May 8, 2002, now issued U.S. Pat. No. 7,681,043.

Said U.S. application Ser. No. 10/326,944 is also a CONTINUATION-IN-PART of U.S. application Ser. No. 09/900,224, filed Jul. 6, 2001, now issued U.S. Pat. No. 7,548,622. Said U.S. application Ser. No. 09/900,224 claims priority to and claims benefit from U.S. Application No. 60/216,588, filed on Jul. 7, 2000.

Said U.S. application Ser. No. 10/326,944 is also a CONTINUATION-IN-PART of U.S. application Ser. No. 10/053,904, filed Jan. 24, 2002, now issued U.S. Pat. No. 7,174,452. Said U.S. application Ser. No. 10/053,904 claims priority to and claims benefit from U.S. Application No. 60/263,793, filed Jan. 24, 2001, and U.S. Application No. 60/272,965, filed Mar. 2, 2001.

Said U.S. application Ser. No. 10/326,944 is also a CONTINUATION-IN-PART of U.S. application Ser. No. 09/525,872, filed Mar. 15, 2000, now issued U.S. Pat. No. 6,868,072. Said U.S. application Ser. No. 09/525,872 claims priority to and claims benefit from U.S. Application No. 60/125,174, filed Mar. 19, 1999, and U.S. Application No. 60/125,292, filed Mar. 19, 1999.

The above-identified applications are hereby incorporated herein by reference in their entirety.

BACKGROUND OF THE INVENTION

Content and rights protection present major obstacles to accessing quality content on content delivery systems. Currently there are no standards for digital rights management (DRM). Instead, there are a variety of proprietary DRM methods and schemes. Therefore, interoperability between different DRM methods does not exist and limits the range of distribution possibilities. Similarly, conflicting conditional access systems used by video delivery systems have limited product competition and content distribution.

Furthermore, conventional DRM products do not provide adequate solutions for use in home networks. They consider only the delivery of content to the user and do not take into account distribution of the content within the home.

Further limitations and disadvantages of conventional and traditional approaches will become apparent to one of ordinary skill in the art through comparison of such systems with some aspects of the present invention as set forth in the remainder of the present application with reference to the drawings.

BRIEF SUMMARY OF THE INVENTION

Aspects of the present invention may be found in, for example, systems and methods that process and protect content. In one embodiment, the present invention may provide a system that processes and protects content. The system may include, for example, a first device coupled to a second device. The first device may include, for example, an integrated circuit that may include a content processing system and a security system. The security system may include, for example, a digital rights manager. The first device and the second device may be part of a network. The network receives content and control information via the first device. The content processing system processes incoming content based upon at least the control information. The integrated circuit protects the content before placing the content on the network.

In another embodiment, the present invention may provide a system that processes and protects content. The system may include, for example, a plurality of devices coupled to a server via a network. The server may include, for example, an application specific integrated circuit (ASIC). The ASIC may include, for example, hardware modules capable of performing the following: processing content and control information, distributing content on the network, and protecting content distributed on the network.

In yet another embodiment, the present invention may provide a method that process and protects content. The method may include one or more of the following: receiving protected content and control information in an integrated circuit; processing, via the integrated circuit, the content based at least upon the control information; protecting the content, via the integrated circuit, before leaving the integrated circuit; and distributing the protected content on a network from the integrated circuit.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1A:
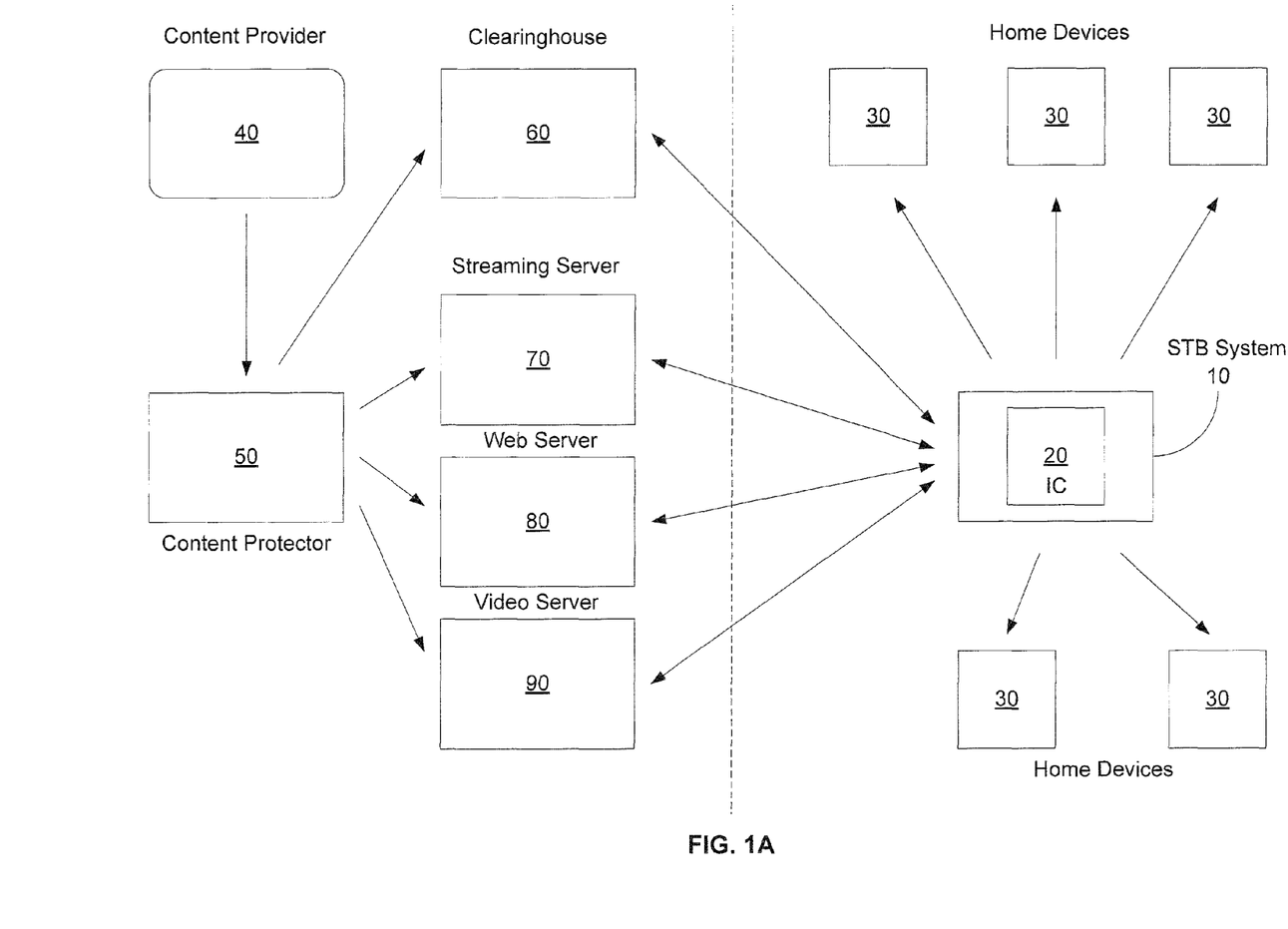
FIG. 1A shows a block flow diagram illustrating an embodiment of a system that provides content processing and protection according to the present invention.

FIG. 1A shows a block flow diagram illustrating an embodiment of a system that provides content processing and protection according to the present invention. The system may include, for example, a set top box system 10, home devices 30, a content provider 40, a content protector 50, a clearinghouse 60, a streaming server 70, a web server 80 and a video server 90. The set top box system 10 may include, for example, an integrated circuit 20 that may be adapted to provide content processing and content protection. In one embodiment, the integrated circuit 20 may include an application specific integrated circuit (ASIC). In another embodiment, some components of the system in addition to the set top box system 10 may include respective integrated circuits 20. For example, in FIG. 1B, one or more of the home devices 30, the clearinghouse 60, the streaming server 70, the web server 80 or the video server 90 may each include a respective integrated circuit 20. Although illustrated as a set top box system, the present invention may contemplate other systems and devices that process or protect content such as, for example, computers, media servers, etc.

As illustrated, the content provider 40 is coupled to the content protector 50. The content protector 50 is coupled to the streaming server 70, the web server 80 and the video server 90. The streaming server 70, the web server 80 and the video server 90 are coupled to the set top box system 10. The content protector 50 is also coupled to the clearinghouse 60 which, in turn, is coupled to the set top box system 10. The clearinghouse 60, the streaming server 70, the web server 80 and the video server 90 may be coupled to the set top box system 10 via, for example, a broadband service system (indicated generally in the FIGS. 1A-B as a dashed line). The set top box system 10 is coupled to the home devices 30. The set top box system 10 may be coupled to the home devices 30 via, for example, wired communications means (e.g., wires, cables, etc.) or wireless communications means (e.g., radio signals, infrared signals, optical signals, etc.) The set top box 10 may also employ any number of communication protocols or standards such as, for example, local area network (LAN), wide area network (WAN), Ethernet, Home Phoneline Network Alliance (HPNA), Bluetooth, digital visual interface (DVI), IEEE 802, IEEE 802.11a, IEEE 802.11b, IEEE 1394, etc.

Figure 1B:
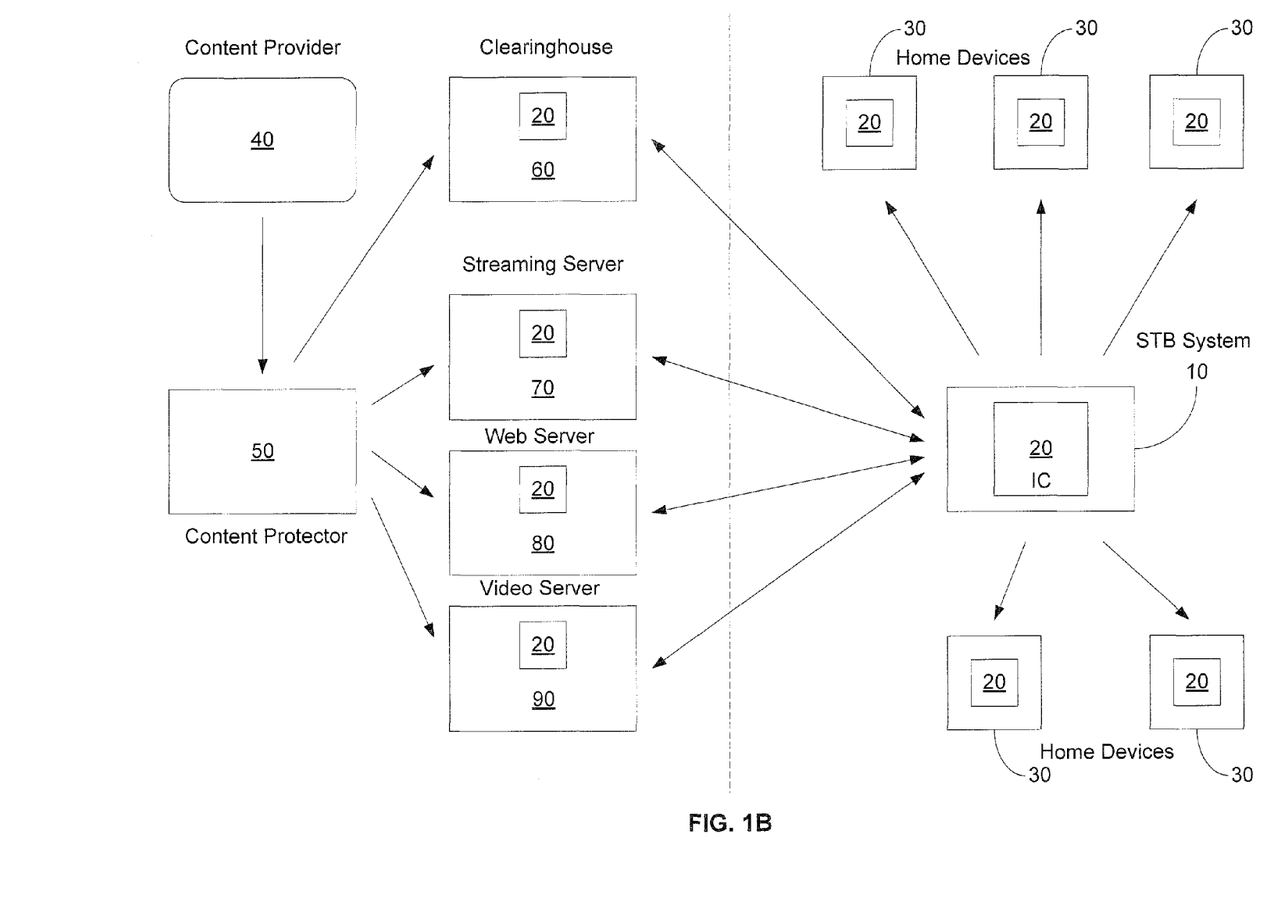
FIG. 1B shows a block flow diagram illustrating an embodiment of a system that provides content processing and protection according to the present invention.

In operation, content is provided by the content provider 40. The content may include, for example, data, audio, video, instructions, usage requirements, etc. The content protector 50 protects the content by using, for example, an encryption scheme, a scrambling scheme, etc. The usage terms are sent by the content protector 50 to the clearinghouse 60. The protector 50 also sends the content to the streaming server 70, the web server 80 and the video server 90. When a subscriber requests to display a particular content such as, for example, a particular program (e.g., cable programming, satellite programming, pay-per-view programming, video-on-demand programming, internet access, a multimedia presentation, etc.) on a particular channel on a particular home device 30 (e.g., a home display), then the integrated circuit 20 of the set top box 10 requests access to the program from the clearinghouse 60. The clearinghouse 60 may be, for example, an e-commerce services clearinghouse license server. The clearinghouse 60 then checks the access request against stored usage terms associated with the program. The clearinghouse 60 then sends an access license (e.g., entitlements) to the integrated circuit 20. The integrated circuit 20 then requests content from the streaming server 70, the web server 80 and/or the video server 90 for distribution in, for example, a home network.

The integrated circuit 20 may perform one or more of the following functions. The integrated circuit 20 may, for example, process the content for display on one or more of the home devices 30. For example, the integrated circuit 20 may include a movie pictures experts group (MPEG) decoding engine including, for example, a digital demodulator, an analog demodulator, an MPEG transport engine, a video decompression engine, an audio decompression engine, etc. The integrated circuit 20 may also prepare the content for distribution on the home network.

The integrated circuit 20 may protect content leaving the integrated circuit 20 or the set top box system 10 and may recover protected content entering the integrated circuit 20 or the set top box system 10. For example, content may be received by the integrated circuit 20 from the servers 70, 80, 90 in a protected format. The integrated circuit 20 may then recover content from the received protected content. Furthermore, to protect the content from end to end, the content may be protected before leaving the integrated circuit 20 for one or more of the home devices 30. In another example, the set top box system 10 may be part of a personal video recording (PVR) system. Accordingly, a storage device may be coupled to the integrated circuit 20. The storage device may be, for example, an electrical storage device, a magnetic storage device, an electromagnetic storage device, an optical storage device, a mechanical storage device, a storage network or some combination thereof. However, to securely buffer the content in the storage device, content sent from the integrated circuit 20 to the storage device is protected before the content leaves the integrated circuit 20. Examples of such systems may be found, for example, in U.S. Provisional Patent Application Ser. No. 60/413,871 entitled "System and Method for Securely Buffering Content" and U.S. patent application Ser. No. 10/310,075, entitled "System and Method for Securely Buffering Content," which were incorporated by reference in their entirety.

The integrated circuit 20 may use the access license from the clearinghouse 60 to determine to which, if any, of the home devices 30 the content may be distributed. Furthermore, the integrated circuit 20 may process control information (e.g., digital rights management (DRM) controls, copy control information (CCI), etc.) in a secure manner. The control information may be used to affect the content processing as well as the control information itself. For example, the control information may be embedded in the transport stream received from the servers 70, 80, 90 indicating, for example, that the content may be copied only once. After the content is copied once, the control information may be changed by the integrated circuit 20, which due to its high level of security is a trusted party, to reflect that the content has been copied once (e.g., change control information to indicate that no more copying of the content is allowed). The integrated circuit 20 may be adapted, for example, to validate control information, to process control information, to affect content processing and to display in light of the validated and processed control information and to modify the control information. Example of such a system may be found, for example, in U.S. Provisional Patent Application Ser. No. 60/414,080 entitled "System and Method for Securely Handling Control Information" and U.S. patent application Ser. No. 10/310,083 entitled "System and Method for Securely Handling Control Information", which were incorporated by reference in their entirety.

The integrated circuit 20 may be adapted to securely control set top box system functions and features. For example, the integrated circuit 20 may include a memory array such as, for example, a non-volatile memory (e.g., a one-time programmable non-volatile memory). The non-volatile memory may include, for example, a data array and banks of mode control bits that may be initially programmed so that the subscriber can access particular features and functions provided by the integrated circuit 20. For example, the mode control bits may be one-time programmed by the subscriber or by the manufacturer to enable particular features or functions. In addition, the mode control bits can be locked using locking bits or other locking mechanisms. The data array may include, for example, security information such as a device identification number and keys that may be locked physically by the one-time programmable memory as well as logically by a cyclical redundancy check (CRC) stored in the non-volatile memory. In addition, the memory array may be further programmed to enable particular features and functions if the subscriber can provide authorization via, for example, a challenge/response mechanism, a password authentication or other authorizing schemes. The integrated circuit 20 may also detect if it has been tampered with and invalidate the memory array, thereby making the integrated circuit 20 useless or thereby allowing the integrated circuit 20 to provide only the most basic services. Examples of such systems may be found, for example, in U.S. patent application Ser. No. 10/141,197 entitled "System and Method for Configuring Device Features via Programmable Memory;" U.S. patent application Ser. No. 10/141,599 entitled "System and Method for Programming Non-Volatile Memory," and U.S. patent application Ser. No. 10/141,549 entitled "System and Method for Securely Controlling Access to Device Functions," which were incorporated by reference in their entirety.

The integrated circuit 20 may also determine access via a conditional access card coupled to an interface coupled to the integrated circuit 20 and protect content between the integrated circuit 20 and the conditional access card. The conditional access card may be, for example, a personal computer memory card international association (PCMCIA) card, a smart card, an interface car, etc. The conditional access card may be a printed circuit board that is plugged into, mounted on, or integrated with a motherboard on which is located the integrated circuit 20. The conditional access card may be, for example, a common interface card or a point of deployment (POD) module. Examples of such systems may be found, for example, in U.S. patent application Ser. No. 10/153,338 entitled "System and Method for Protecting Transport Stream Content," which was incorporated by reference in its entirety.

The integrated circuit 20 may also provide a home gateway digital rights manager. The home gateway digital rights manager may be adapted to, for example, encrypt content, authenticate end points, secure rights management and revoke rights. In support of DRM, the integrated chip 20 may be adapted to provide one or more of the following, including: security protection on digital interfaces; secure rights handling; and secure processing, input/output (I/O) and crypto-engine function. The latter option may provide restricted access to the memory and I/O; operational integrity; and a secure crypto-toolkit.

The home gateway digital rights manager may include, for example, a hardware crypto-toolkit that may be used for DRM, conditional access and e-commerce. The toolkit may provide a set of cryptographic and security capabilities that can be used by the DRM provider in support of its communication protocols. Hardware tools offer higher performance levels (e.g., processing speeds) and provide security over software architectures. Hardware tools also offer hardware protection for key transfers and key storage while, for example, being staged for insertion encrypt/decrypt blocks or authentication algorithms.

In one embodiment, the DRM architecture offers a comprehensive security capability including one or more of the following: access control; content protection; rights management; privacy; full-home network coverage; flexibility with respect to content delivery and distribution; support for various transport formats (e.g., download, streaming, etc.); PVR store-and-forward; and home networking.

Some aspects of the present invention may provide some or all of the security functionality in the hardware of an integrated circuit. The hardware of the integrated circuit may also be adapted to provide content processing. In one embodiment, all of the security functionality may be embedded in the same integrated circuit (e.g., a single integrated chip) that also provides content processing.

Figure 2:
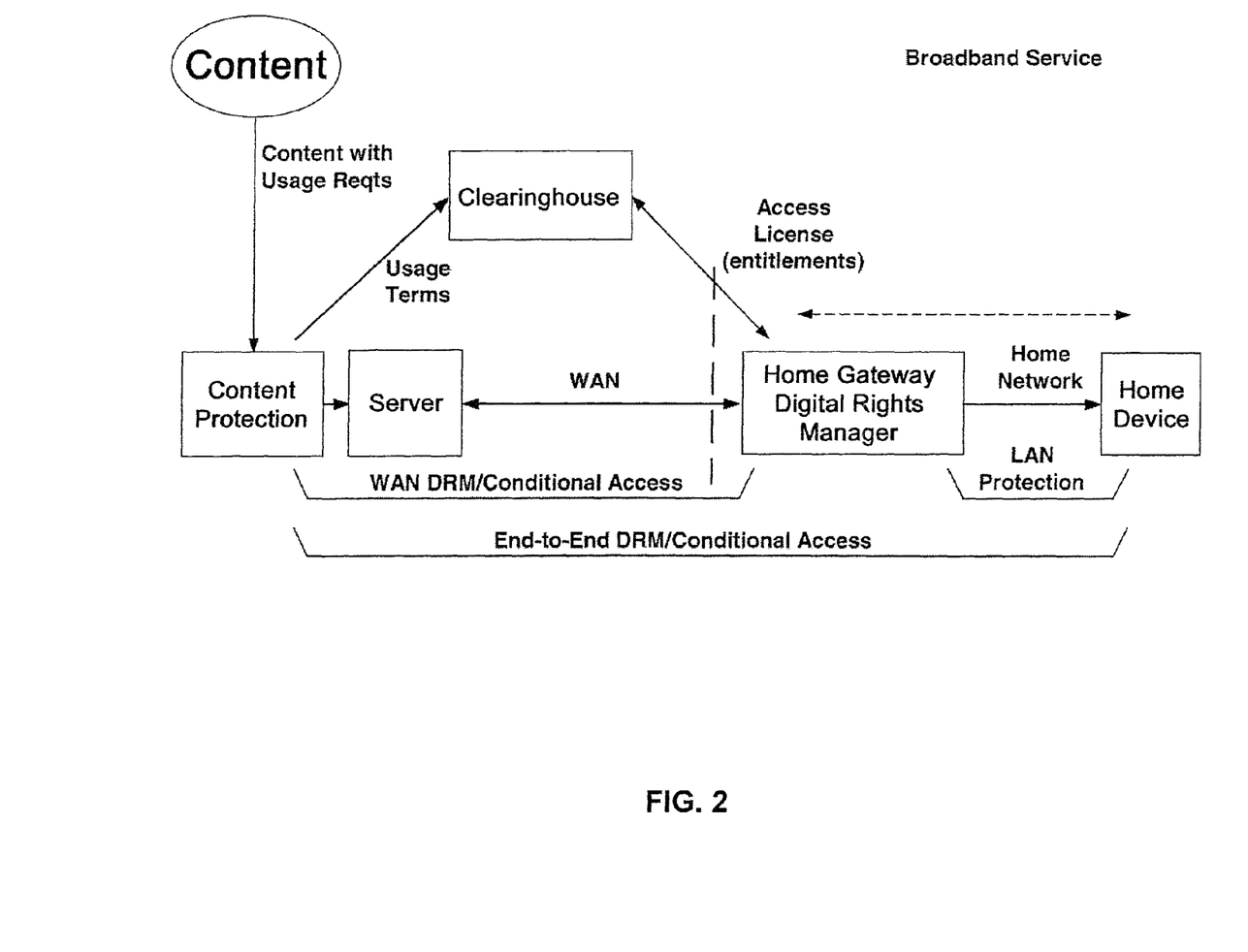
FIG. 2 shows a block flow diagram illustrating an embodiment of a system that provides content distribution and protection using a home gateway digital rights manager according to the present invention.

FIG. 2 shows a block flow diagram illustrating an embodiment of a system that provides content distribution and protection using a home gateway digital rights manager according to the present invention. The home gateway digital rights manager provides DRM support into the home and also provides an end-to-end protection solution.

Figure 3:
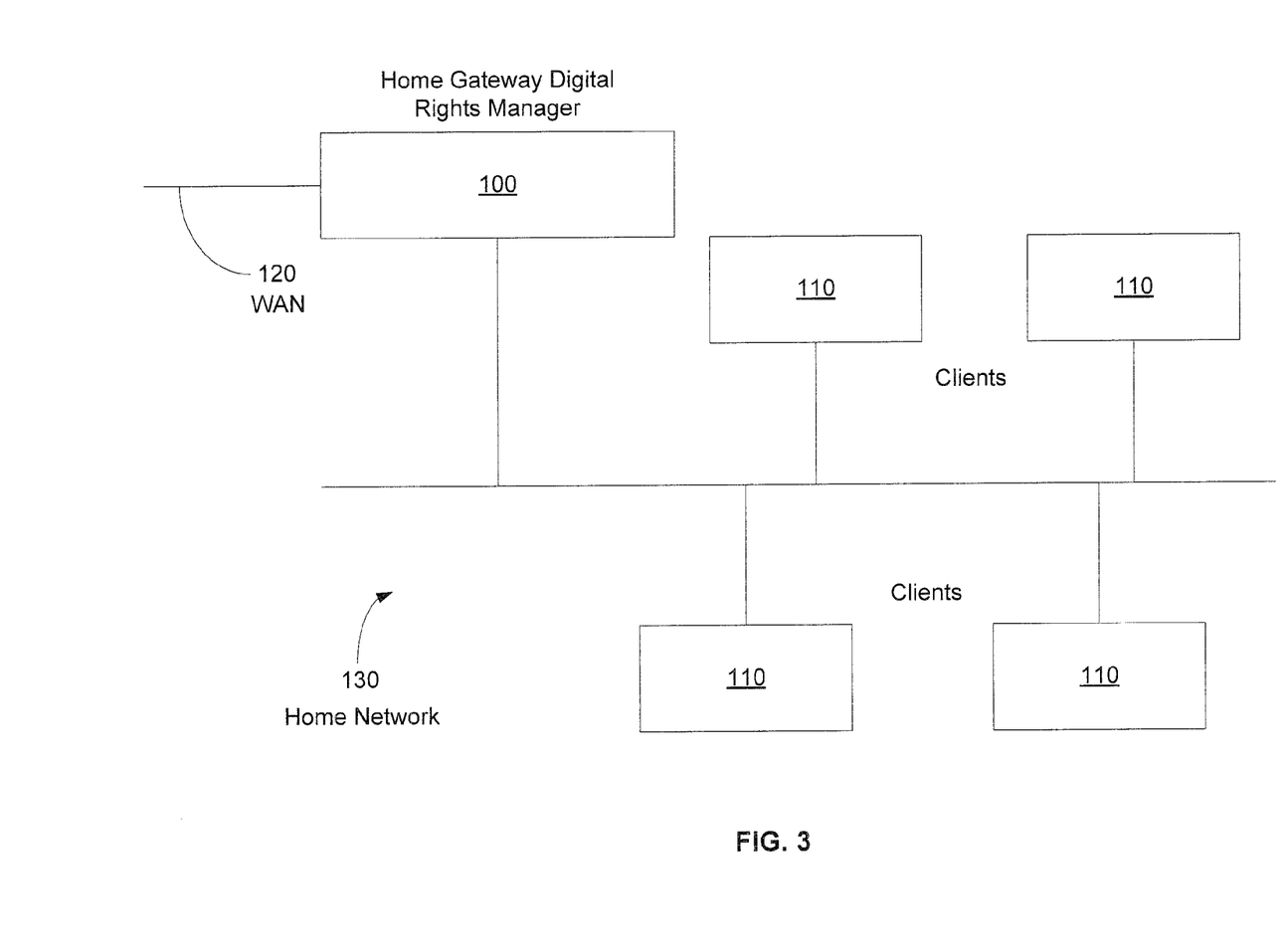
FIG. 3 shows a block diagram illustrating an embodiment of a home network according to the present invention.

FIG. 3 shows a block diagram illustrating an embodiment of a home network according to the present invention. The home network (e.g., an HPNA home network) 130 may include, for example, a home gateway digital rights manager 100 and clients 110 (e.g., HPNA clients). The home gateway digital rights manager 100 may also be coupled to a WAN 120.

In one embodiment, the home gateway digital rights manager 100 may decrypt content received on the WAN 120 according to a conditional access system or a DRM system and then re-encrypt the content to be distributed on the home network using a home network encryption. For example, the data encryption standard (DES), triple DES (3DES) or 3DES PVR encryption may be used to protect content on the home network 130. In addition, all nodes may be authenticated to the home gateway digital rights manager 100.

Figure 4:
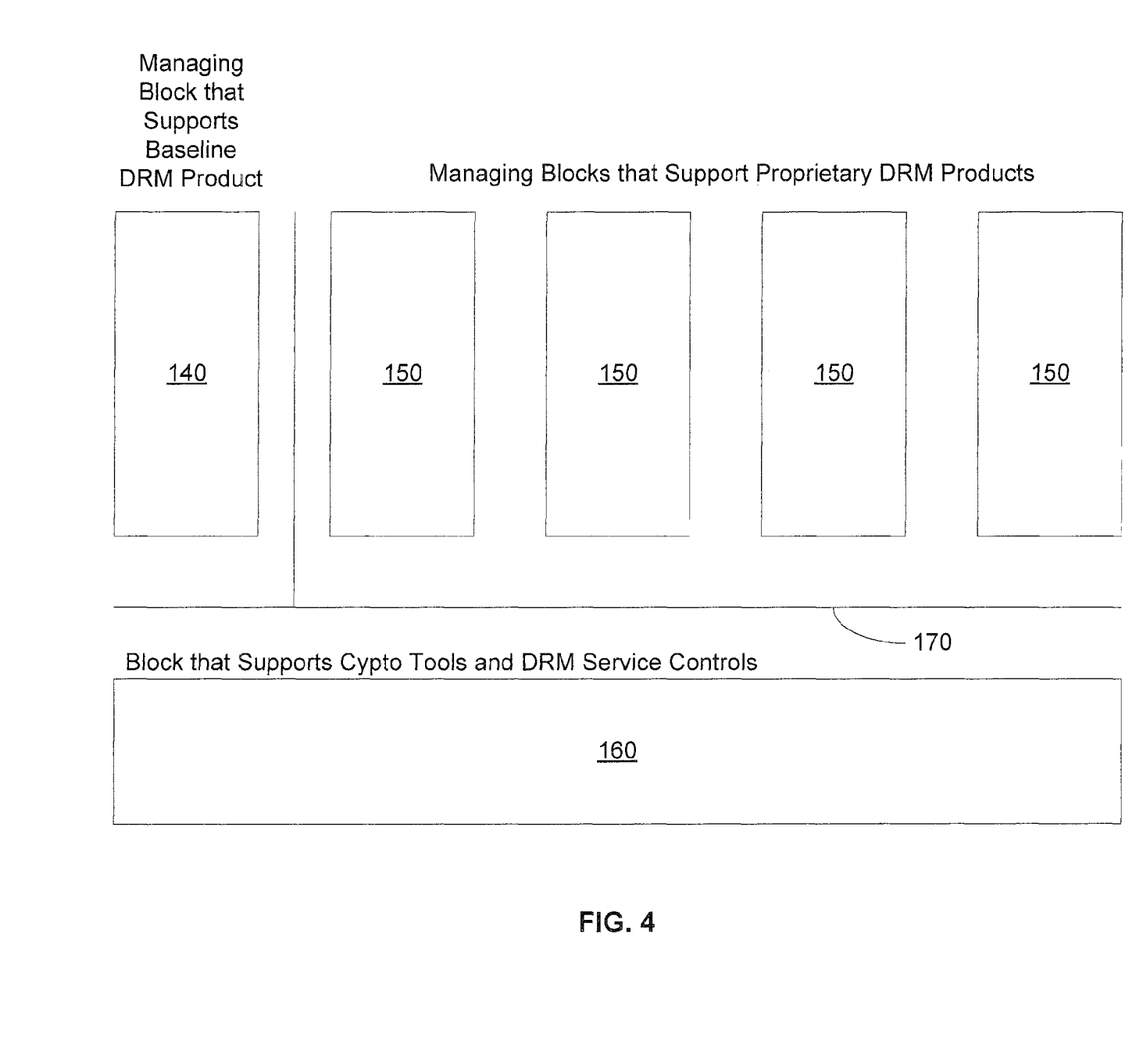
FIG. 4 shows a block diagram illustrating an embodiment of a digital rights management (DRM) architecture according to the present invention.

FIG. 4 shows a block diagram illustrating an embodiment of a DRM architecture according to the present invention. The DRM architecture includes, for example, a managing block 140 that supports a baseline DRM product (e.g., a standards-based DRM product), managing blocks 150 that support proprietary DRM products, an application program interface (API) and a block 160 that supports crypto tools and DRM service controls. Accordingly, the DRM architecture can support either a baseline DRM product or a proprietary DRM product. The DRM architecture may also be able to convert the proprietary DRM control information into, for example, baseline DRM control information or other proprietary DRM control information so as to overcome interoperability problems between DRM methods. Furthermore, the DRM architecture also may support, complement and supplement a particular manufacturer's proprietary security hardware and software capabilities by providing access to the crypto tools available from the integrated circuit 20. For example, the crypto tools may extend the management of content while, for example, being recorded or shared with other devices.

Crypto tools may include, for example, one or more of the following cryptographic hardware modules in support of content protection and security. For example, a DVB common descrambler and DES/3DES devices may be used in MPEG transport decryption for conditional access. DES/3DES devices may be used in personal video recording. DVI/HDCP and PVR DES/3DES may be used in home networking. Furthermore, crypto tool may include a general set of cryptographic tools (e.g., for internet protocol and above), including: DES, 3DES, RC4, advanced encryption standard (AES); secure hash algorithm-1 (SHA1), message digest 5 (MD5), HMAC-SHA1, HMAC-MD5, public key acceleration (RSA/DSS/DH), etc.

In one embodiment, the present invention may provide a highly integrated system-on-a-chip ASIC architecture capable of merging content protection and security functions with audio and video decoding and processing functions. With a baseline DRM or common DRM standard, compliant functions can be built-in to single-chip devices and can eliminate the need and costs associated with special purpose hardware security modules. With content protection and security capabilities integrated with the processing and interface functions of a single-chip device, the single-chip device may provide full-hardware tamper resistance or supplement software tamper-resistance schemes.

Figure 5:
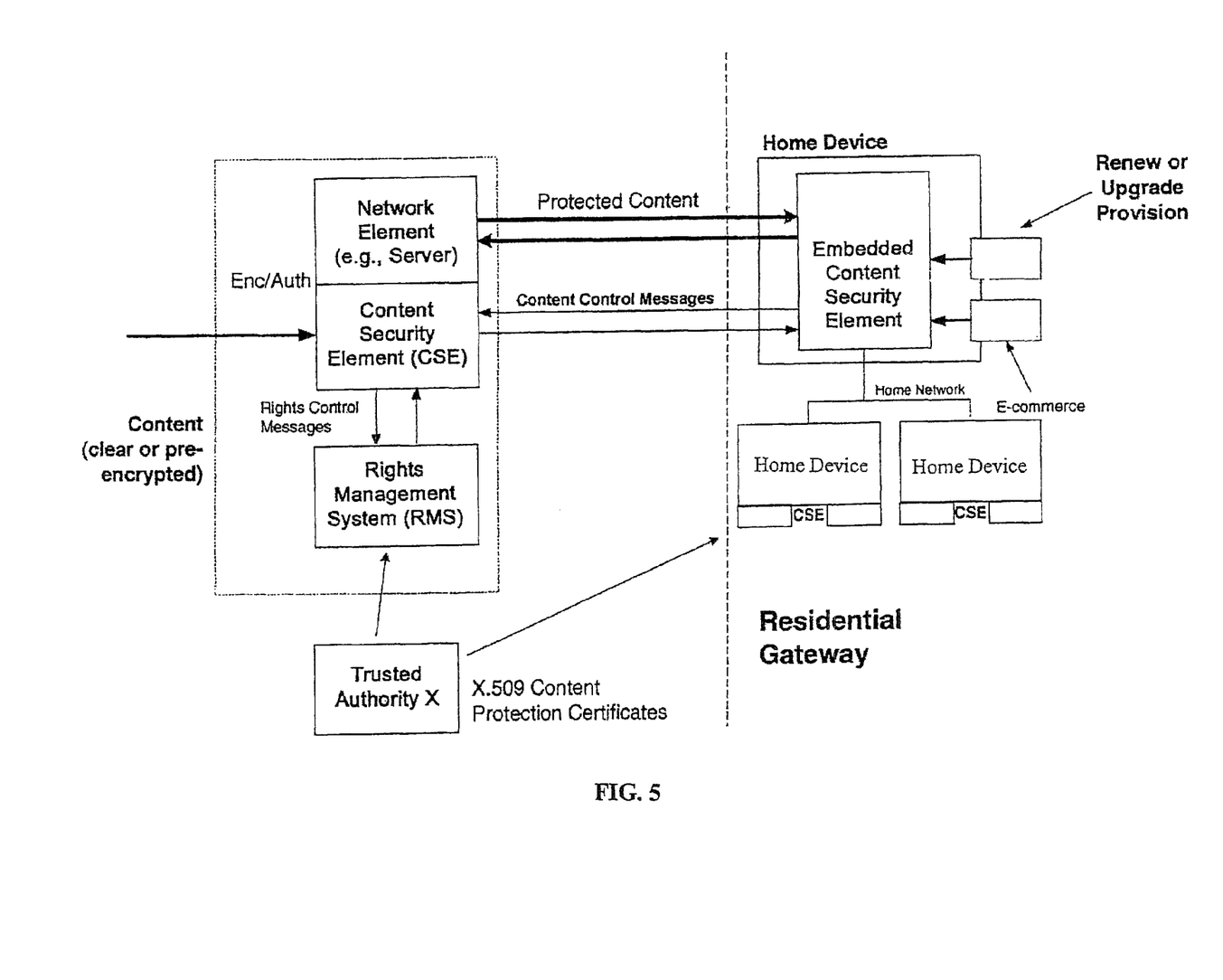
FIG. 5 shows a block diagram illustrating an embodiment of a DRM architecture with embedded content security according to the present invention.

FIG. 5 shows a block diagram illustrating an embodiment of a DRM architecture with embedded content security according to the present invention. The home network may include, for example, home devices. One or more of the home devices may include, for example, an embedded content security element. One or more of the home devices may be adapted for receiving conditional access cards. In one example, the home device may be adapted to receive a conditional access card for use in e-commerce or a conditional access card for use in renewing or upgrading features or functions of the home device. One or more of the home devices may be coupled to a remote system that, for example, may provide content and control. The remote server may include, for example, a network element (e.g., a server) a content security element and a rights management system.

In operation, a home device requests particular programming from the remote system. The home device may also send content control messages. The content control messages may reflect information received by the home device from any conditional access cards as well as other information stored in the home device. For example, the content control message may include a digital certificate from a trusted authority (e.g., a certification authority) that may assist the remote system in verifying the identity of the home device or the home network. The content control message may be parsed by the content security element which may request and obtain particular rights for the rights management system. The particular rights granted to the home device may be based upon, for example, the content control messages and the particular program request received by the remote system. Based upon the granted rights, the remote system may send the particular program as protect content with accompanying control information. The home device may then process the protected content received from the remote system based upon, for example, the control information and the available or enabled home device features or functions. The home device may then send to requested content to one or more of the other home devices on the home network. The content may be protected with, for example, a particular home network encryption. The distribution of the content within the home network may be limited, for example, by the control information.

By combining one or more of the above-identified functions on a single integrated chip (e.g., an ASIC), the system-on-a-chip device may offer one or more of the following advantages. For example, integration may result in lower overall product costs. Integration onto a single device may include the integration of DRM functions, thereby sustaining a higher level of tamper resistance. Furthermore, the security of the set top box system 10 may be enhanced over software-only environments or segregated security modules.

By using hardware protection, access to content and content protection parameters can be restricted. Hardware protection is more robust than software-only tamper resistance schemes. Furthermore, if the hardware is attacked, the attacks are not easily scaled to larger populations. In contrast, hacked software is relatively easy to distribute to a large population of unauthorized users. With hardware protections, the endpoints can gain a higher level of trust. The distribution of high-value content may directly result from the deployment of highly trusted, interoperable equipment and systems for the distribution of content.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for processing and securing content, comprising:
   a computing device comprising an integrated circuit, the integrated circuit comprising a content processing system and a security system, the security system comprising a digital rights manager; and
   a plurality of second devices wirelessly coupled to the computing device and forming a wireless network,
   wherein the wireless network receives content and control information via the computing device,
   wherein the content processing system of the integrated circuit processes incoming content based upon at least the control information, the incoming content and the control information being received by the computing device from an external broadband network, and
   wherein the integrated circuit secures the content before placing the content on the wireless network.

2. The system according to claim 1,
   wherein the security system comprises a non-volatile memory, the non-volatile memory comprising a set of mode control bits, the set of mode control bits comprising one-time programmable bits, and
   wherein device features of the computing device are securely programmed via the set of mode control bits.

3. The system according to claim 2, wherein the non-volatile memory comprises a one-time programmable memory, wherein the one-time programmable memory stores one or more of the following: a cryptographic key and a device identification number of the computing device.

4. The system according to claim 1,
   wherein the computing device buffers or stores content in a storage device, wherein the content buffered or stored in the storage device is secured before leaving the integrated circuit, and wherein the protected content buffered or stored in the storage device is recovered after entering the integrated circuit.

5. The system according to claim 4, wherein the storage device comprises a directly-attached storage device or a network-attached storage device.

6. The system according to claim 1, wherein the wireless network supports one or more of the following wireless communication protocols: Bluetooth, IEEE 802.11 and an amendment to IEEE 802.11.

7. The system according to claim 1, wherein the security system monitors digital rights management controls and/or copy control information.

8. The system according to claim 1, wherein the integrated circuit secures the content placed on the network using a network encryption scheme.

9. The system according to claim 1, wherein the integrated circuit is operatively coupled to a conditional access card.

10. The system according to claim 9, wherein information flowing between the conditional access card and the integrated circuit has been encrypted or copy protected.

11. The system according to claim 1, wherein the integrated circuit comprises a crypto tool kit that supports one or more of the following: DVB descrambling, DES, 3DES, DVI/HDCP, PVR DES/3DES, RC4, AES, SHA1, MD5, HMAC-SHA1, HMAC-MD5 and RSA/DSS/DH.

12. The system according to claim 1, wherein the digital rights manager supports a first type of digital rights management and a second type of digital rights management.

13. The system according to claim 12, wherein the digital rights manager supports interoperability between the first type of digital rights management and the second type of digital rights management.

14. The system according to claim 1, wherein the computing device is part of a set top box, a server, a media server, a computer, a home network system, or a personal video recording system.

15. The system according to claim 1, wherein the integrated circuit comprises an application specific integrated circuit (ASIC).

16. The system according to claim 1, wherein the incoming content is provided by a content provider to the integrated circuit via the external broadband network, and wherein the control information is provided by a clearinghouse to the integrated circuit via the external broadband network.

17. The system according to claim 16, wherein the incoming content is provided by the content provider through one or more of the following: a content protector, a streaming server, a web server and a video server.

18. The system according to claim 16, wherein the clearinghouse comprises an e-commerce services clearinghouse license server, wherein the content provider provides usage terms to the e-commerce services clearinghouse license server, wherein the e-commerce services clearinghouse license server stores the usage terms, wherein the integrated circuit requests access to particular content from the e-commerce services clearinghouse license server, wherein the e-commerce services clearinghouse license server checks the access request against stored usage terms associated with the particular content, and wherein the e-commerce services clearinghouse license server sends an access license to the integrated circuit.

19. The system according to claim 18, wherein, after receiving the access license from the e-commerce services clearinghouse license server, the integrated circuit requests the particular content from a streaming server, a web server or a video server that is servicing the content provider.

20. The system according to claim 19, wherein the integrated circuit uses the access license to determine to which of the plurality of second devices the incoming content that includes the particular content can be distributed.

21. A system for processing and securing content, comprising:
a computing device comprising an integrated circuit, the integrated circuit comprising a content processing system and a security system, the security system comprising a digital rights manager;
wherein the content processing system of the integrated circuit processes incoming content based upon at least the control information, the incoming content and the control information being received by the computing device from an external broadband network;
wherein the computing device is configured to store content in a storage device and provide the stored content to a wireless network; and
wherein the content buffered or stored in the storage device is secured before leaving the integrated circuit.

22. A system for processing and securing content, comprising:
a computing device comprising an integrated circuit, the integrated circuit comprising a content processing system and a security system, the security system comprising a digital rights manager;
wherein the content processing system of the integrated circuit processes incoming content based upon at least the control information, the incoming content and the control information being received by the computing device from an external broadband network;
wherein the computing device is configured to store content in a storage device and provide the stored content to a wireless network; and
wherein the digital rights manager supports a first type of digital rights management and a second type of digital rights management.

* * * * *

UNITED STATES PATENT AND TRADEMARK OFFICE
CERTIFICATE OF CORRECTION

PATENT NO. : 8,271,800 B2
APPLICATION NO. : 12/485694
DATED : September 18, 2012
INVENTOR(S) : Jeffrey Douglas Carr It is certified that error appears in the above-identified patent and that said Letters Patent is hereby corrected as shown below:

In the Claims:

Column 9
Line 3, Claim 4, please replace "wherein the protected content buffered" with --wherein the secured content buffered--.

Column 10
Line 32, Claim 21, please replace "storage device and provide" with --storage device and to provide--.

Column 10
Line 34, Claim 21, please replace "content buffered or stored" with --content stored--.

Column 10
Lines 43-45, Claim 22, please replace "content based upon at least the control information, the incoming content and the control information" with --content based upon control information and the incoming content, the control information--.

Column 10
Line 48, Claim 22, please replace "storage device and provide" with --storage device and to provide--.

Signed and Sealed this
Third Day of September, 2013

Teresa Stanek Rea
*Acting Director of the United States Patent and Trademark Office*